US008615642B2

(12) United States Patent
Bomma et al.

(10) Patent No.: US 8,615,642 B2
(45) Date of Patent: Dec. 24, 2013

(54) AUTOMATIC PAGE PROMOTION AND DEMOTION IN MULTIPLE PAGE SIZE ENVIRONMENTS

(75) Inventors: Shashidhar Bomma, Austin, TX (US); Andrew Dunshea, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 926 days.

(21) Appl. No.: 12/578,623

(22) Filed: Oct. 14, 2009

(65) Prior Publication Data

US 2011/0087857 A1  Apr. 14, 2011

(51) Int. Cl.
G06F 12/00 (2006.01)
G06F 13/00 (2006.01)
G06F 13/28 (2006.01)

(52) U.S. Cl.
USPC ............ 711/171; 711/173; 711/206; 711/209

(58) Field of Classification Search
USPC .................................. 711/171, 173, 206, 209
See application file for complete search history.

(56) References Cited

U.S. PATENT DOCUMENTS

2007/0106875 A1* 5/2007 Mather ......................... 711/206
2008/0126738 A1* 5/2008 Hepkin et al. ................ 711/171
2008/0141266 A1* 6/2008 Hunt et al. .................... 718/106
2008/0288718 A1* 11/2008 Hepkin et al. ................ 711/104

OTHER PUBLICATIONS

Jann, Joefon et al., "Effectiveness of Multiple Pageable Page Sizes for Commercial Applications", *Software: Practice and Experience* vol. 38; No. 12; Copyright © 2007 John Wiley & Sons, Ltd.; IBM T.J. Watson Research Center, P.O. Box 218, Route 134, Yorktown Heights, NY 10598, U.S.A. Dec. 19, 2007, pp. 1261-1272.

* cited by examiner

*Primary Examiner* — Christian P Chace
*Assistant Examiner* — Ryan Bertram
(74) *Attorney, Agent, or Firm* — DeLizio Gilliam, PLLC

(57) ABSTRACT

Functionality can be implemented in a virtual memory manager (VMM) to allow small pages (e.g., 4 KB) to be coalesced into large pages (e.g., 64 KB), so that a single free list can be maintained for the large pages ("maintained pages"). When a process requests a small page, the VMM can associate a maintained page with a memory segment accessible by the process. Then, the maintained page can be divided to form a set of small pages ("fragments"). The fragments can become available pages in a broken page list. The VMM can satisfy the request by allocating one of the fragments in the broken page list. If the process requests additional small pages, the additional requests can be satisfied from the broken page list. When the process terminates, the fragments in the broken page list become a maintained page and can be returned to the free list.

15 Claims, 4 Drawing Sheets

AUTOMATIC PAGE PROMOTION AND DEMOTION IN MULTIPLE PAGE SIZE ENVIRONMENTS

BACKGROUND

Embodiments of the inventive subject matter generally relate to the field of virtual memory management, and, more particularly, automatic page promotion and demotion in multiple page size environments.

The IBM® POWER5+™ processor supports multiple page sizes (i.e., 4 KB, 64 KB, 16 MB, and 16 GB). The 64 KB pages can be divided into sixteen 4 KB pages ("demotion") and sixteen 4 KB pages can be coalesced into one 64 KB page ("promotion"). Frequent requests for 4 KB pages can lead to a shortage of 64 KB pages and performance degradation for processes requiring 64K pages. When a threshold of remaining 64 KB pages is reached, a page size monitor daemon (PSMD) searches an available list of 4 KB pages that can be promoted. The 4 KB pages cannot be promoted unless the PSMD finds sixteen contiguous 4 KB pages, so promotion can be challenging.

SUMMARY

Embodiments include a method directed to detecting a page request associated with a first of a plurality of processes. In some embodiments, a first page can be allocated to a process in response to the page request. If a page size indicated in the page request is smaller than a page size of the first page, the first page can be divided into a plurality of smaller pages. A broken page list can be created indicating availability of each of the plurality of smaller pages. The broken page list can be associated with a memory segment accessible by the first of the plurality of processes. The page request can be satisfied with a first of the plurality of smaller pages.

Embodiments include a computer program product directed to determining that a process is terminating. If a memory segment accessible by the process is associated with a broken page list, the broken page list is dissociated from the memory segment. A free list can be updated to indicate that the first page is available.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to 64 KB and 4 KB page sizes, embodiments can be implemented for different page sizes. In other instances, well-known instruction instances, protocols, structures, and techniques have not been shown in detail in order not to obfuscate the description.

Page promotion can be computationally intensive when 64 KB and 4 KB pages are stored in separate free lists without regard to the pages' physical locations in memory. According to some page promotion techniques, each entry in the 4 KB free list is queried to locate sixteen 4 KB pages that collectively occupy 16 KB of contiguous memory space. Functionality can be implemented in a virtual memory manager (VMM) to allow all of the small pages (e.g., 4 KB) to be coalesced into large pages (e.g., 64 KB), so that a single free list can be maintained for the large pages ("maintained pages"). When a process (e.g., an application program) requests a small page, the VMM can associate a maintained page with a memory segment accessible by the process. Then, the maintained page can be divided to form a set of small pages ("fragments"). The fragments can become available pages in a broken page list associated with the memory segment. The VMM can satisfy the request by allocating one of the fragments in the broken page list to the process. If the process requests additional small pages, the additional requests can also be satisfied from the broken page list when additional fragments are available. If additional fragments are not available, the VMM can allocate a second maintained page, divide the second maintained into fragments, add the fragments to the broken page list, and satisfy the request with one of the added fragments. When the process terminates, the fragments in the broken page list can be automatically returned to the free list because the fragments are contiguous and constitute a single maintained page.

Figure 1:
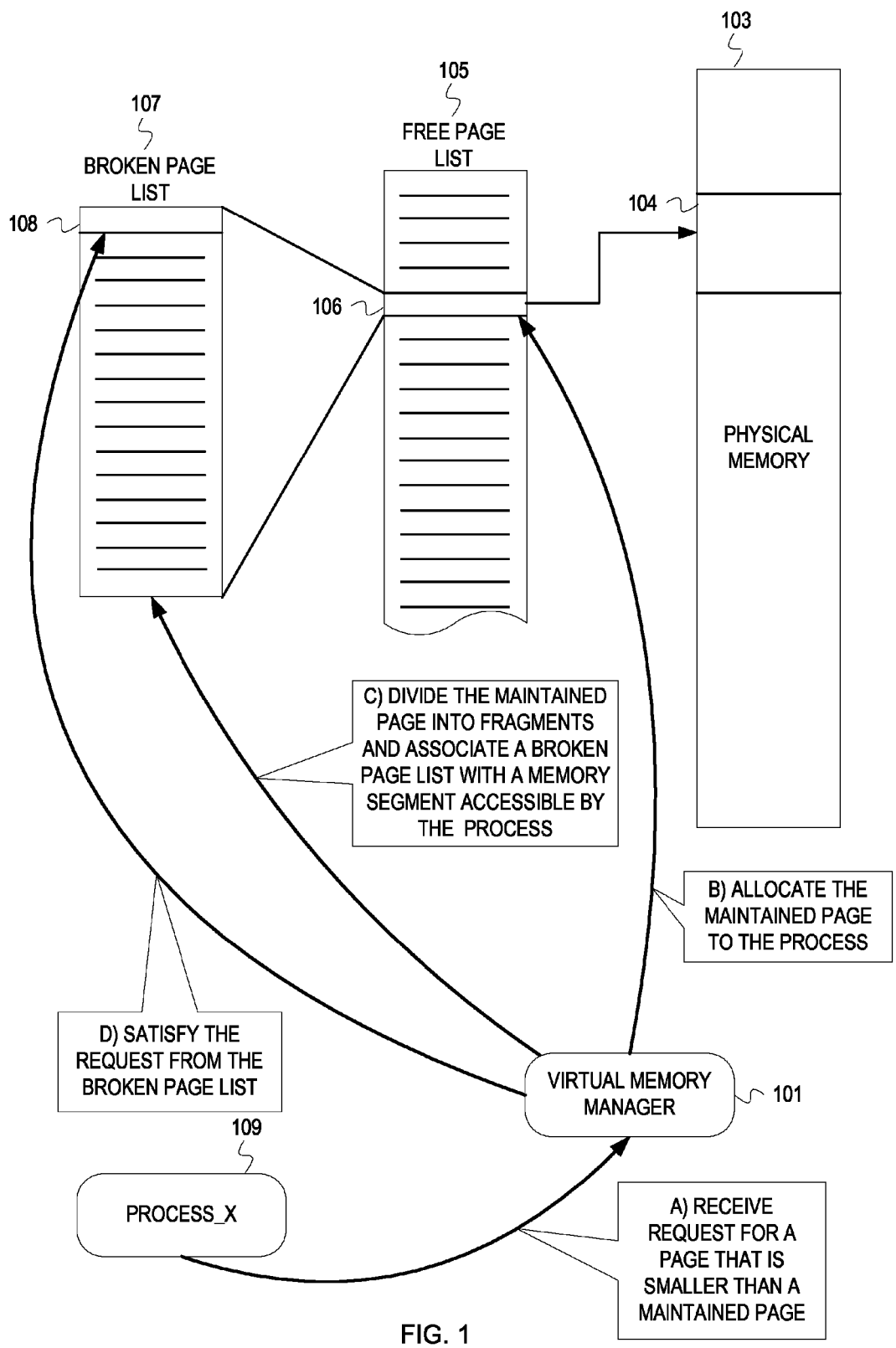
FIG. 1 is an example conceptual diagram of managing page demotion.

FIG. 1 is an example conceptual diagram of managing page demotion. FIG. 1 shows dataflow and operations occurring in stages A-D. At stage A, the VMM 101 receives a request, from process_x 109, for a page that is smaller than a maintained page. Maintained pages can be the largest page size that a hardware architecture allows to be demoted into smaller pages. For example, the IBM® POWER5+™ processor supports 4 KB, 64 KB, 16 MB, and 16 GB page sizes, but only allows 64 KB pages to be demoted to 4 KB pages. Therefore, the 64 KB page represents the maintained page.

At stage B, the VMM 101 allocates the maintained page 106 to the process_x 109. Allocating the maintained page 106 to the process_x 109 can comprise searching the free page list 105 for an available maintained page and updating the free page list 105 to indicate that the maintained page 106 is unavailable. An identifier of the process_x 109 can be stored in the free page list 105 along with a pointer to the broken page list. In this example, the maintained page 106 in the free page list 105 corresponds to a 64 KB block of memory 104 in physical memory 103.

At stage C, the VMM 101 divides the maintained page 106 into fragments and associates a broken page list 107 with a memory segment accessible by the process_x 109. The fragments can become available pages in the broken page list 107. In this example, the VMM 101 divides the 64 KB maintained page 106 into sixteen 4 KB fragments.

At stage D, the VMM 101 satisfies the request by allocating a page from the broken page list 107. In this example, the fragment 108 (e.g., a 4 KB page made by demoting a 64 KB page) is allocated to process_x 109 to satisfy the request. If the process_x 109 requests additional pages that are smaller than a maintained page, the VMM 101 can satisfy the additional request from available fragments (e.g., 4 KB pages) in the broken page list 107. In addition, after the process terminates, the broken page list 107 can be automatically dissociated from the process, so that the maintained page 106 is reconstituted and made available in the free page list 105.

In some embodiments, the fragments in the broken page list can be further divided into smaller fragments. For example, 16 MB pages can be divided into 256 64 KB pages. The 64 KB pages can be further divided into sixteen 4 KB pages. As noted above, such smaller pages can occupy a contiguous space in memory.

Figure 2:
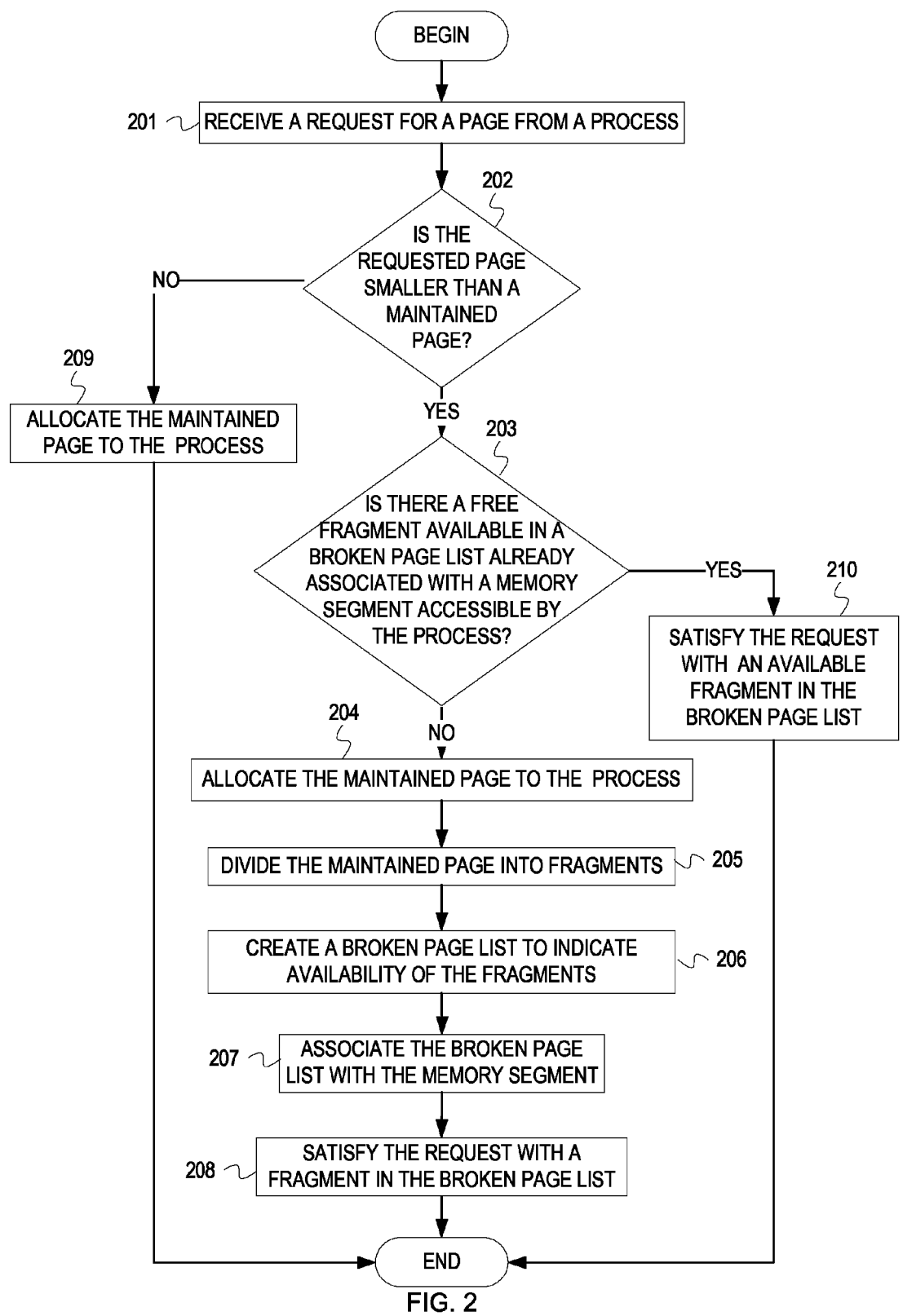
FIG. 2 is a flowchart depicting example operations for managing page demotion.

FIG. 2 is a flowchart depicting example operations for managing page demotion. Flow begins at block 201, where a VMM receives, from a process, a request for a page. For example, the VMM detects a page fault. Flow continues at block 202.

At block 202, the VMM determines if the requested page is smaller than a maintained page. If the requested page is smaller than the maintained page, flow continues at block 203. If the requested page is not smaller than the maintained page, flow continues at block 209.

At block 203, the VMM determines if there is a free fragment in a broken page list already associated with a memory segment accessible by the process. The broken page list may already be associated with the memory segment if the process previously requested a page smaller than the maintained page. If there is not a free fragment, flow continues at block 204. If there is a free fragment, flow continues at block 210.

At block 204, the VMM allocates the maintained page to the process, because a broken page list is not already associated with the memory segment. Allocating the maintained page can comprise searching a free page list for an available maintained page. Flow continues at block 205.

At block 205, the VMM divides the maintained page into fragments. The VMM can divide the maintained page into fragments of equal size. For example, The VMM divides a 256 KB maintained page into sixteen 16 KB fragments. Flow continues at block 206.

At block 206, the VMM creates a broken page list to indicate availability of the fragments. For example, the broken page list comprises entries for each fragment. The entries can comprise an "available" field and an address corresponding to a location of the fragment in physical memory. In some embodiments, the "available" field (e.g., a bit) is set to zero if the fragment is available, or it is set to one if the fragment has been allocated. As another example, a broken page list contains addresses for free fragments. When a fragment is allocated, the fragment's address is removed from the free list. Flow continues at block 207.

At block 207, the VMM associates the broken page list with the memory segment accessible by the process. The VMM can associate the broken page list with the memory segment by storing an identifier of the process in the free page list. After the broken page list has been associated with the memory segment, pages from the broken page list cannot be assigned to other processes. Flow continues at block 208.

At block 208, the VMM satisfies the request with a fragment in the broken page list and flow ends. The VMM may also update an "available" field in the broken page list to indicate that the fragment is unavailable.

At block 209, the requested page is not smaller than the maintained page, so the VMM allocates the maintained page to the process and flow ends.

At block 210, a free fragment is available in the broken page list already associated with the memory segment, so the VMM satisfies the request with an available fragment in the broken page list and flow ends. Satisfying the request with the available fragment can comprise searching the broken page list for the available fragment.

Figure 3:
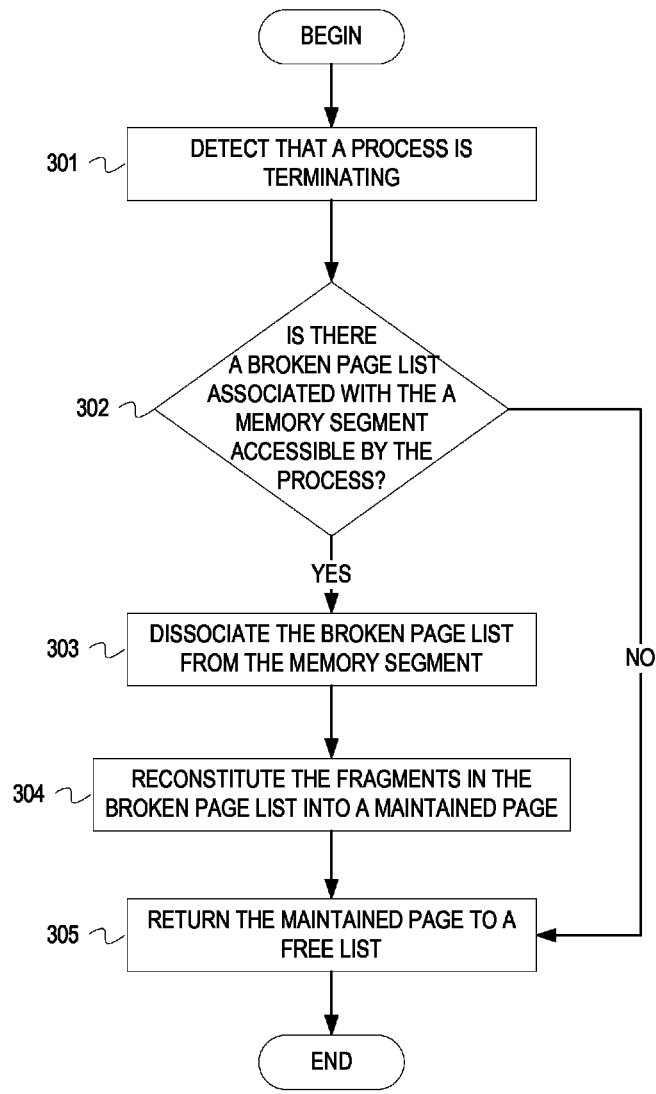
FIG. 3 is a flowchart depicting example operations for automatically promoting pages.

When a process terminates, fragmented pages can be automatically promoted to maintained pages because the fragmented pages are contiguous. FIG. 3 is a flowchart depicting example operations for automatically promoting pages. Flow begins at block 301, where a VMM detects that a process is terminating. For example, the VMM receives a request to free memory from the process. Flow continues at block 302.

At block 302, the VMM determines whether there is a broken page list associated with the process. For example, the VMM searches a free page list for a pointer to the broken page list based on an identifier of the process. Flow continues at block 303, if the broken page list is associated with the process. Flow continues at block 304, if the broken page list is not associated with the process.

At block 303, the VMM dissociates the broken page list from the process. For example, the VMM removes a pointer to the process from a free page list. Flow continues at block 304.

At block 304, the VMM reconstitutes the fragments in the broken page list into a maintained page because the fragments occupy contiguous memory locations. Flow continues at block 305.

At block 305, the VMM returns the maintained page to the free page list and flow ends. Returning the maintained page to the free page list can comprise updating the free list to indicate that the maintained page is available.

Although examples refer to returning maintained pages to a free page list upon process termination, embodiments are not so limited. For example, a maintained page may be returned to the free page list in response to a request from a process to free the maintained page.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing ("machine-readable storage medium") or transmitting ("machine-readable signal medium") information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, machine readable signal medium embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 4:
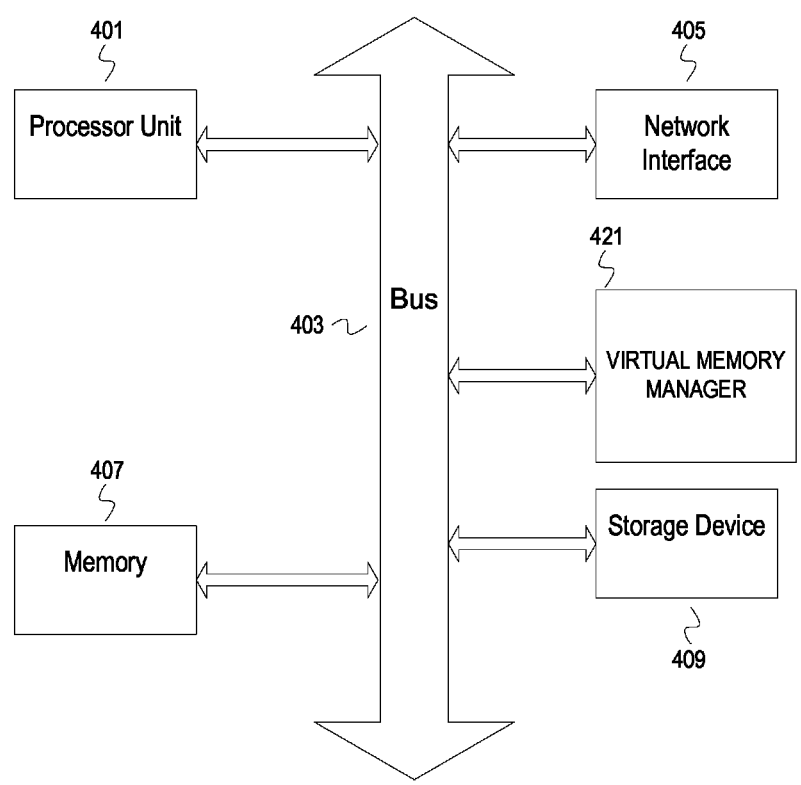
FIG. 4 depicts an example computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The computer system also includes a VMM 421. The VMM 421 allocates a maintained page to a process and divides the maintained page into fragments in response to receiving a request for a page that is smaller than the maintained page from the process. The VMM 421 also associates a broken page list with the process to indicate availability of the fragments. The VMM 421 satisfies the process' page requests from available fragments in the broken page list. Upon detecting termination of the program, the VMM 421 dissociates the broken page list from the process and returns the maintained page to a free list. Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for automatic page promotion and demotion in multiple page size environments as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer implemented method comprising:
   detecting a page request associated with a first of a plurality of processes;
   allocating, in response to the page request, a first page to the first of the plurality of processes;
   determining that a page size indicated in the page request is smaller than a page size of the first page;
   in response to determining that the page size indicated in the page request is smaller than the page size of the first page, dividing the first page into a plurality of smaller pages;
   creating a broken page list associated with the first of the plurality of processes, the broken page list indicating availability of each of the plurality of smaller pages;
   storing an identifier of the process and a pointer to the broken page list in a free page list to associate the broken page list with a memory segment accessible by the first of the plurality of processes, wherein the smaller pages are only available for use by the first of the plurality of processes; and
   satisfying the page request with a first of the plurality of smaller pages.

2. The computer implemented method of claim 1, wherein said allocating the first page to the process in response to the page request comprises:
   determining that the first page is available based on searching a free page list; and
   updating the free page list to indicate that the first page is unavailable.

3. The computer implemented method of claim 1, wherein the broken page list comprises entries for each of the plurality of pages, wherein each of the entries comprises a field indicating availability of each of the plurality of pages, and an address corresponding to a location of each of the plurality of pages in physical memory.

4. The computer implemented method of claim 1 further comprising:
   receiving a second page request from the first of the plurality of processes;
   determining that a page size indicated in the second page request is smaller than a page size of the first page;
   determining that the memory segment accessible by the first of the plurality of processes is associated with the broken page list;
   searching the broken page list for a second of the plurality of smaller pages that is available; and
   satisfying the second page request with the second of the plurality of smaller pages.

5. The computer implemented method of claim 1 further comprising:
   determining that the first of the plurality of processes is terminating;
   determining that the memory segment accessible by the first of the plurality of processes is associated with the broken page list;
   dissociating the broken page list from the memory segment; and
   updating a free page list to indicate that the first page is available.

6. A computer program product for managing page promotion and demotion, the computer program product comprising:

a machine-readable storage medium having computer usable program code embodied therewith, the computer usable program code comprising:

computer usable program code configured to,
- detect a page request associated with first of a plurality of processes;
- allocate, in response to the page request, a first page to the first of the plurality of processes;
- determine that a page size indicated in the page request is smaller than a page size of the first page;
- in response to the determination that the page size indicated in the page request is smaller than the page size of the first page, divide the first page into a plurality of smaller pages;
- create a broken page list associated with the first of the plurality of processes, the broken page list indicating availability of each of the plurality of smaller pages;
- store an identifier of the process and a pointer to the broken page list in a free page list to associate the broken page list with a memory segment accessible by the first of the plurality of processes, wherein the smaller pages are only available for use by the first of the plurality of processes; and
- satisfy the page request with a first of the plurality of smaller pages.

7. The computer program product of claim 6, wherein the computer usable program code being configured to allocate the first page to the process in response to the page request comprises the computer usable program code being configured to:
- determine that the first page is available based on searching a free page list; and
- update the free page list to indicate that the first page is unavailable.

8. The computer program product of claim 6, wherein the broken page list comprises entries for each of the plurality of pages, wherein each of the entries comprises a field indicating availability of each of the plurality of pages, and an address corresponding to a location of each of the plurality of pages in physical memory.

9. The computer program product of claim 6 comprises the computer usable program code being further configured to:
- receive a second page request from the first of the plurality of processes;
- determine that a page size indicated in the second page request is smaller than a page size of the first page;
- determine that the memory segment accessible by the first of the plurality of processes is associated with the broken page list;
- search the broken page list for a second of the plurality of smaller pages that is available; and
- satisfy the second page request with the second of the plurality of smaller pages.

10. The computer program product of claim 6 comprises the computer usable program code being further configured to:
- determine that the first of the plurality of processes is terminating;
- determine that memory segment accessible by the first of the plurality of processes is associated with the broken page list;
- dissociate the broken page list from the memory segment; and
- update a free page list to indicate that the first page is available.

11. An apparatus comprising:
- a processing unit;
- a network interface; and
- a virtual memory manger operable to,
  - detect a page request associated with a first of a plurality of processes;
  - allocate, in response to the page request, a first page to the first of a plurality processes;
  - determine that a page size indicated in the page request is smaller than a page size of the first page;
  - in response to the determination that the page size indicated in the page request is smaller than the page size of the first page, divide the first page into a plurality of smaller pages;
  - create a broken page list associated with the first of the plurality of processes, the broken page list indicating availability of each of the plurality of smaller pages;
  - store an identifier of the process and a pointer to the broken page list in a free page list to associate the broken page list with a memory segment accessible by the first of the plurality of processes; and
  - satisfy the page request with a first of the plurality of smaller pages.

12. The apparatus of claim 11, wherein the virtual memory manager being operable to allocate the first page to the process in response to the page comprises the virtual memory manager being operable to:
- determine that the first page is available based on searching a free page list; and
- update the free page list to indicate that the first page is unavailable.

13. The apparatus of claim 11, wherein the broken page list comprises entries for each of the plurality of pages, wherein each of the entries comprises a field indicating availability of each of the plurality of pages, and an address corresponding to a location of each of the plurality of pages in physical memory.

14. The apparatus of claim 11 comprises the virtual memory manager being further operable to:
- receive a second page request from the first of the plurality of processes;
- determine that a page size indicated in the second page request is smaller than a page size of the first page;
- determine that the memory segment accessible by the first of the plurality of processes is associated with the broken page list;
- search the broken page list for a second of the plurality of smaller pages that is available; and
- satisfy the second page request with the second of the plurality of smaller pages.

15. The apparatus of claim 11 comprises the virtual memory manager being further operable to:
- determine that the first of the plurality of processes is terminating;
- determine that the a memory segment accessible by the first of the plurality of processes is associated with the broken page list;
- dissociate the broken page list from the memory segment; and
- update a free page list to indicate that the first page is available.

* * * * *